United States Patent

[11] 3,624,355

[72] Inventor Jerome P. Friedrichs
Des Plaines, Ill.
[21] Appl. No. 78,719
[22] Filed Oct. 7, 1970
[45] Patented Nov. 30, 1971
[73] Assignee Motorola, Inc.
Franklin Park, Ill.

[54] TEMPERATURE CONTROL SYSTEM
13 Claims, 1 Drawing Fig.
[52] U.S. Cl..................................... 219/497,
219/499
[51] Int. Cl..................................... H05b 1/02
[50] Field of Search........................... 219/486,
497, 499, 501

[56] References Cited
UNITED STATES PATENTS
3,240,948 3/1966 Burley........................... 219/499
3,453,415 7/1969 Hermes et al................. 219/486
3,558,857 1/1971 Braun........................... 219/499

*Primary Examiner*—Bernard A. Gilheany
*Assistant Examiner*—F. E. Bell
*Attorneys*—Vincent J. Rauner and L. Arnold

ABSTRACT: A temperature control system for a constant temperature oven wherein a thermistor in the oven changes resistance in response to changes in temperature causing an amplifier to oscillate. The amplitude of the oscillation signal is proportional to the difference between the oven temperature and a reference temperature. The oscillation is rectified and coupled to a temperature adjusting circuit, including two heater elements. The first heater element is proportionally energized in accordance with the oscillation signal amplitude. The temperature adjusting circuit also includes bias means coupled to the second heater element and operative in response to oscillation signals in excess of a predetermined amplitude to proportionally energize the second heater element.

PATENTED NOV 30 1971
3,624,355
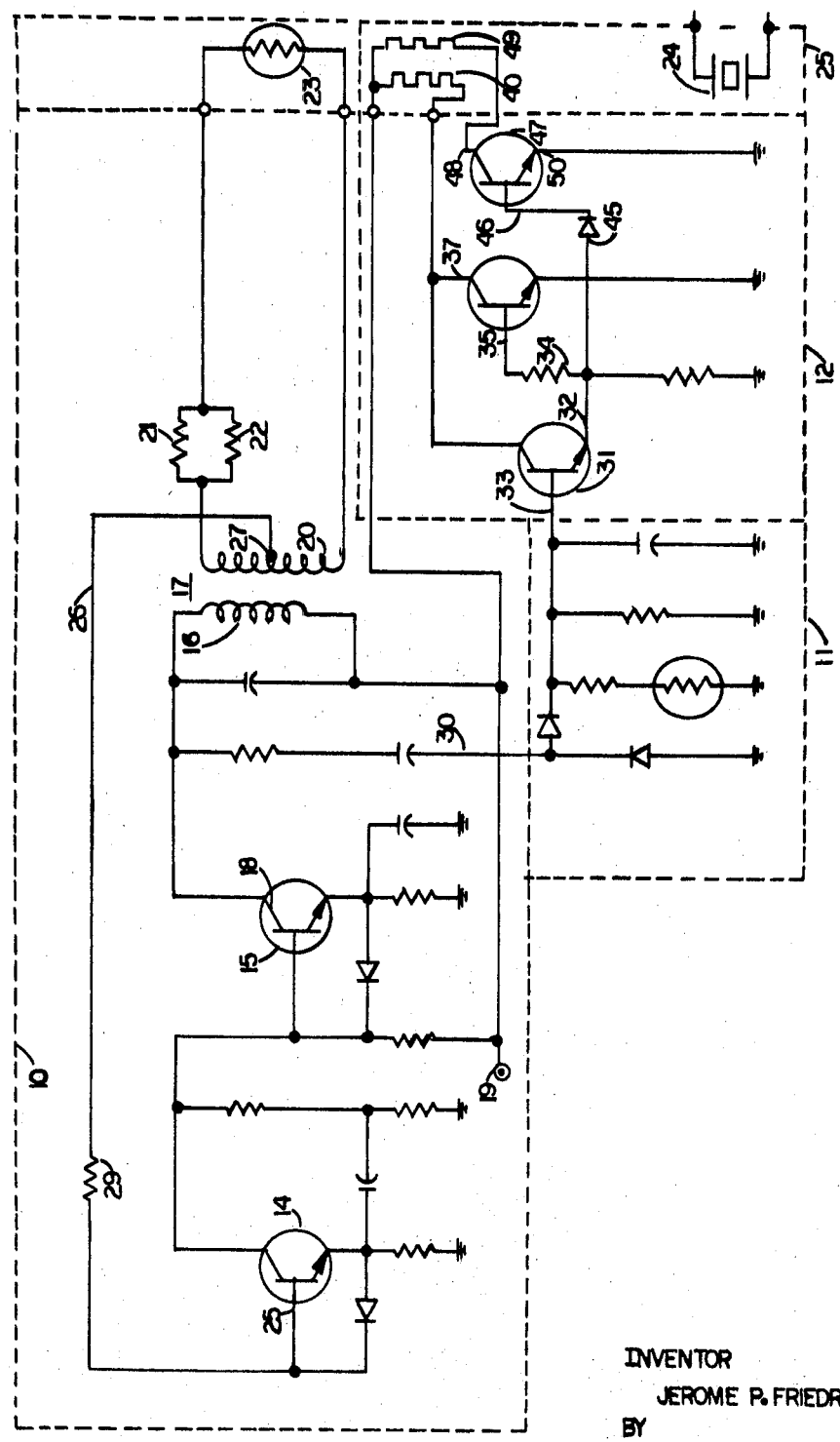
INVENTOR
JEROME P. FRIEDRICHS
BY
Vincent J. Rauner
ATTY.

3,624,355

TEMPERATURE CONTROL SYSTEM

BACKGROUND OF THE INVENTION

Oscillators designed to provide a precise frequency often employ piezoelectric crystals. These crystals are sensitive to temperature variations and must be maintained at a constant temperature if the oscillator is to provide a precise frequency. In certain applications, such as a crystal oscillator for a mobile radio, the crystal oscillator cannot be heated when the vehicle or mobile radio in which it operates is not in use. The temperature control system used to maintain a constant temperature in the crystal oven must be capable of quickly bringing the crystal oven to the desired temperature when the vehicle or mobile radio is turned on. Prior art systems for providing a fast warm up of the crystal oven often employ two sensing elements and two control systems. One sensing element is used to maintain the temperature at the desired or reference temperature, and is normally operated with a proportional type control system. The other element is used to provide the fast warm up and is normally operated with an "on-off" type control system. The "on-off" type control system senses a temperature variation from the desired ambient in excess of a predetermined amount and turns on a heater element until the variation drops to less than the predetermined amount. The use of two sensing elements doubles the required circuitry. With two sensing elements, two adjustments are also necessary to set the ambient temperature.

A crystal oscillator in a mobile radio may be subjected to substantial environmental temperature variations. The system described above cannot maintain proportional control of the oven over a substantial environmental temperature range due to the "on-off" characteristic of one sensing element.

If one sensing circuit and one control system must be used, as for example, where space or cost considerations are important, the control system, particularly the power transistor controlling the heater element, must be capable of dissipating substantial power in order to provide a desired fast warm up characteristic. When the oven reaches the reference temperature, or is operating at temperatures near the reference temperature, the power transistor will be operating very inefficiently. This results in the dissipation of a substantial amount of power, which is undesirable when operating from a limited source of power such as provided in a mobile environment.

SUMMARY OF THE INVENTION

It is therefore an object of this invention to provide a temperature control system requiring only one adjustment to set the desired reference temperature for two heating elements.

Another object of this invention is to provide an improved temperature control system employing a single sensing element and controller circuit to selectively operate two proportional heater elements.

Yet another object of this invention is to provide a proportional temperature control system having a low power consumption.

In practicing this invention there is provided a temperature control system for maintaining a piezoelectric crystal oven at a constant temperature. An amplifier in the temperature control system includes a thermistor which is located in the oven. Changes in temperature within the oven from a desired or reference temperature produce a change in thermistor resistance. The changed thermistor resistance changes the amplifier feedback and causes the amplifier to oscillate. The amplitude of the oscillations varies in proportion to the difference between the oven temperature and the reference temperature. The oscillations are rectified and filtered to develop a DC voltage which varies in accordance with the temperature variations. The DC voltage is coupled to a temperature adjusting circuit including first and second heater elements. The temperature adjusting circuit is operative in response to the amplitude of the DC voltage to proportionally energize the first heater element. A bias circuit allows proportional operation of the second heater element when the DC voltage exceeds a predetermined level. The two heater elements stabilize the temperature in the oven at the reference temperature. The amount of heat generated by each element is proportional to the amplitude of the DC voltage coupled to the temperature adjusting circuit.

THE DRAWING

The FIGURE is a schematic diagram of a temperature control system for a constant temperature oven incorporating the features of this invention.

DETAILED DESCRIPTION OF THE EMBODIMENT

In the FIGURE there is shown a temperature control system for a constant temperature oven which is used to maintain a piezoelectric crystal used in the precision oscillator, at a constant temperature. In a precision oscillator the crystal must be maintained at a constant temperature if the oscillator is to maintain a precise output frequency. The control system includes a temperature responsive amplifier circuit 10, a detector circuit 11, and a temperature adjusting circuit 12.

Temperature responsive amplifier circuit 10, consists of a two stage amplifier employing a balanced bridge circuit and positive feedback to produce oscillations in the amplifier. The amplitude of amplifier oscillations is a function of the degree of unbalance of the bridge network. Transistors 14 and 15 comprise the first and second stages of temperature responsive amplifier circuit 10. Primary winding 16 of transformer 17 is connected from collector 18 of transistor 15 to a source of operating potential 19. Transformer 17 has a secondary winding 20, with a center tap 27. Connected in series with secondary winding 20 are the parallel combination of fixed resistors 21 and 22, and thermistor 23. Thermistor 23 is physically located within oven 25, the oven containing the piezoelectric crystal 24, which must be maintained at the reference temperature. Lead 26 connected to center tap 27 of secondary winding 20, of transformer 17 is returned to base 28 of transistor 14 through resistor 29, providing positive feedback to the input of the two stage amplifier. Secondary winding 20 of transformer 17, resistors 21 and 22, and thermistor 23 form a bridge network. Resistors 21 and 22, and thermistor 23 are selected such that the bridge circuit is balanced at a desired or reference temperature. A change in temperature within oven 25, will cause a change in resistance of thermistor 23, unbalancing the bridge. The degree of unbalance is proportional to the difference between the temperature within oven 25 and the reference temperature. If the oven temperature is at the reference temperature, the bridge circuit, comprising secondary winding 20 of transformer 17, resistors 21 and 22 and thermistor 23 will be balanced and no oscillations will be developed. If the bridge is unbalanced due to the oven temperature being different than the reference temperature, a voltage is developed across secondary winding 20 of transformer 17. A portion of this voltage is coupled from tap 27 of secondary winding 20 to base 28 of transistor 14 by lead 26. As the signal coupled to base 28 of transistor 14 is positive feedback, and the amplifier has a loop gain of approximately one, the circuit will begin to oscillate. The amplitude of the oscillation signal is a function of the degree of the unbalance in the bridge circuit.

The oscillation signal is coupled by lead 30 to detector circuit 11 where it is rectified and filtered to develop a direct current (DC) voltage signal. The DC signal amplitude varies in accordance with the variation in temperature within oven 25 from the reference temperature.

The DC signal developed in detector 11 is coupled to temperature adjusting circuit 12 where it is used to adjust the temperature within oven 25 back to the reference temperature. Temperature adjusting circuit 12 includes heater elements 40 and 49, located within oven 25, and used to provide the heat necessary to maintain oven 25 at the reference temperature. Heater element 40 is connected between B+ potential, terminal 19, and collector 37 of heater driving transistor 36.

Heater element 49 is connected between B+ potential and collector 48 of heater driving transistor 47. Transistor 31 is an amplifier transistor used to drive transistors 36 and 47. Emitter 32 of transistor 31 is coupled to resistor 34 which is coupled to base 35 of transistor 36. Diode 45 couples emitter 32 of transistor 31 to base 46 of transistor 47.

In operation, if there is a large temperature variation between the temperature of oven 25 and the reference temperature, such as may exist when a mobile unit employing an oven such as oven 25 initially energizes and prepares for service, or when the mobile unit ambient temperature is substantially different than the reference temperature, a high amplitude oscillation signal will be developed in amplifier circuit 10 due to the bridge circuit unbalance. This oscillation signal is coupled by lead 30 to detector circuit 11 where it is filtered and rectified to develop a DC signal. The DC signal is coupled to base 33 of transistor 31. The DC signal coupled to base 33 of transistor 31 will have an amplitude proportional to the amplitude of the oscillation signal and will therefore be quite high. This will cause transistor 31 to conduct and develop a high voltage at emitter 32. The voltage at emitter 32 is coupled through resistor 34 to base 35 of transistor 36, causing transistor 36 to conduct. Transistor 36 will draw base current through base 35 of transistor 36 and a maximum amount of current through heater element 40. The voltage drop across resistor 34 produced by the conduction of transistor 36 will provide a substantial forward bias on diode 45. This forward bias will cause transistor 47 to conduct and draw a maximum amount of current through heater element 49. At this time, therefore, both heater elements 40 and 49 are supplying maximum power to heat oven 25. As the oven warms up, the bridge circuit unbalance decreases, decreasing the oscillation amplitude of amplifier circuit 10. The signal coupled to operate 33 of transistor 31 will also decrease, decreasing the forward bias, and conduction in transistor 31. A reduced conduction will cause a decrease in the voltage at emitter 32 of transistor 31. The reduced forward bias now coupled to base 46 of transistor 47 by diode 45 will decrease the conduction of transistor 47, decreasing the current flowing through heater element 49. A decreased amount of current flowing through heater element 49 will decrease the amount of heat generated. As the temperature differential further decreases, the forward bias coupled to transistor 47 is further decreased until transistor 47 becomes reverse biased, turning off heater element 49. This occurs when the combined voltage drops across diode 45 and the base emitter junction of transistor 47 equals the combined voltage drops across resistor 34 and the base emitter junction of transistor 36.

With the transistor 47 turned off, the voltage drop at emitter 32 of transistor 31 is still sufficient to forward bias transistor 36, causing transistor 36 to conduct and draw a maximum amount of current through heater element 40. The power output of heater element 40 is approximately equivalent to the maximum heat loss of the oven, and can maintain oven 25 at the reference temperature so long as there is no substantial change in ambient conditions.

A further warming of oven 25 will decrease the signal coupled to base 33 of transistor 31, further decreasing its conduction and therefore the voltage developed of emitter 32. This reduced voltage will reduce the conduction of transistor 36, decreasing the current flowing through heater element 40. With less current, the amount of heat generated by heater element 40 will decrease.

As oven 25 approaches the reference temperature, the amount of heat generated by heated element 10 will continue to decrease until heat is generated only to compensate for the heat loss of the oven. If the ambient temperature should increase, causing the oven temperature to reach or exceed the reference temperature, the oscillations will stop and heater element 40 will no longer generate heat.

Using two proportionally controlled heater elements to provide control of the piezoelectric crystal oven 25 has the further advantage of conserving power. Power conservation is achieved while still being able to supply a sufficient amount of heat to bring the oven temperature to the reference temperature, quickly after a mobile unit is turned on, or when the unit's ambient temperature is substantially different than the reference temperature. For example, assuming a total oven heating capacity of 20 watts were required to maintain the oven at the reference temperature under all circumstances, and to bring the oven temperature to the reference temperature from an off state. If a single transistor were used, capable of supplying enough current to operate a 20 watt heater element, when 5 watts of power were required to heat the oven, the transistor would dissipate 5 watts. This occurs due to the inefficiency associated with operating a power transistor at a condition other than full saturation. If instead of a one heater oven, a two heater oven such as that shown in the drawing is provided, the total heating and power consumption when both heaters are fully operative remains the same, at approximately 20 watts. Here, however, heater element 40 has a 7 watt capacity and heater element 49 has a 13 watt capacity. As the power required by the oven decreases to 5 watts, the 13 watt heater, element 49, dissipates no power, and heater element 40, the 7 watt element dissipates 5 watts. Transistor 36, still operating at or near its saturation point, will dissipate less than 1 watt. The oven efficiency, heater power plus total power, has been improved from 50 percent for a single oven to approximately 85 percent for the two heater oven shown.

As can be seen, a temperature control system for a constant temperature oven has been provided which is capable of providing a fast warmup, and is capable of maintaining the oven at the reference temperature. Two heater elements are provided in order to reduce the power consumption of the control system. Both heater elements are operated selectively and proportionally in response to control signals from a single reference source. Using the single reference source reduces the number of adjustments necessary in the system in order to operate the temperature control system at the reference temperature.

I claim:

1. A temperature control system for a constant temperature oven including in combination, first circuit means including a temperature sensitive element positioned in said oven for developing a first signal varying in amplitude in accordance with the deviation in temperature from a reference temperature within said oven, second circuit means including a first temperature adjusting means coupled to said first circuit means, said second circuit means operative to proportionally energize said first temperature adjusting means in response to said first signal amplitude, said second circuit means further including bias means and second temperature adjusting means, said bias means operative in response to said first signals in excess of a predetermined amplitude to proportionally energize said second temperature adjusting means.

2. The temperature control system of claim 1 wherein said first and second temperature adjusting means includes first and second heater elements for heating said oven.

3. The temperature control system of claim 1 wherein said first and second temperature adjusting means each including a heater element for heating said oven and, a transistor coupled to said heater element and operative in response to said first signal to proportionally energize said heater element.

4. The temperature control system of claim 3 wherein said bias means is a diode coupled to said first and second temperature adjusting means, said diode being operative in response to said first signals in excess of a predetermined amplitude to proportionally energize said second temperature adjusting means.

5. The temperature control system of claim 1 wherein said second circuit means includes: first semiconductor means coupled to said first circuit means and operative in response to said first signal to develop a first voltage which varies in accordance with said first signal, second semiconductor means coupled to said first heater element and said first semiconductor means, said second semiconductor means being operative in response to said first voltage to energize said first heater element in accordance with said first voltage variations, third semiconductor means coupled to said second heater element, diode means coupled to said first semiconductor means and said third semiconductor means, said diode means being operative in response to a first voltage in excess of a predetermined amount to proportionally energize said third semiconductor means, said third semiconductor means operative to proportionally energize said heater element in accordance with said first voltage variation in excess of said first predetermined amount.

6. The temperature control system of claim 5 wherein said temperature sensing means is a thermistor having a resistance which varies in accordance with the deviation in temperature from a reference temperature within said oven.

7. The temperature control system of claim 6 wherein said first circuit means includes an amplifier including said thermistor, said amplifier operative to develop oscillation signals varying in amplitude in accordance with the variations in said thermistor resistance, and detector means coupled to said amplifier means, said detector means developing said first signals in response to said oscillation signals.

8. A temperature control system for a constant temperature oven including in combination, amplifier means including temperature responsive means mounted is said oven, said amplifier means developing an oscillation signal which varies in accordance with the deviation in temperature within said oven from a reference temperature, rectifier circuit means coupled to said amplifier means for rectifying said oscillation signal and developing a first voltage which varies in amplitude in accordance with said oscillation signal, a temperature adjusting circuit including first and second heating means mounted in said oven, said temperature adjusting circuit being coupled to said rectifier circuit means and operative in response to said first voltage to proportionally energize said first heater means, said temperature adjusting circuit further including bias means coupled to said second heating means and operative in response to said first voltage in excess of a predetermined amplitude to proportionally energize said second heater means, said first and second heating means heating said oven to maintain same at said reference temperature.

9. The temperature control system of claim 8 wherein said temperature responsive means is a thermistor.

10. The temperature control system of claim 8 wherein said first and second heating means are heater elements.

11. The temperature control system of claim 9 wherein said amplifier means includes a bridge circuit including said thermistor, said bridge circuit being balanced when said oven temperature is the same as said reference temperature, said bridge circuit being unbalanced when said oven temperature varies from said reference temperature, the degree of unbalance of said bridge circuit varying in accordance with the deviation in temperature within said oven from said reference temperature, said amplifier means operative in response to said unbalance to develop said oscillation signals.

12. The temperature control system of claim 11 wherein said bias means is a diode.

13. The temperature control circuit of claim 12 wherein said temperature adjusting circuit includes: first semiconductor means coupled to said rectifier circuit means and operative in response to said first voltage to develop a second voltage which varies in amplitude in accordance with said first voltage, second semiconductor means coupled to said first semiconductor means and to said first heater element, said second semiconductor means operative in response to said second voltage amplitude to proportionally energize said first heater element, diode means coupled to said second semiconductor means, said diode means rendered conductive in response to said second voltage in excess of a predetermined amplitude, third semiconductor means coupled to said second heating means and said diode means said third semiconductor means being operative in response to conduction of said diode to proportionally energize said second heating means.

* * * * *